US011930785B2

(12) United States Patent
Smith (10) Patent No.: US 11,930,785 B2
(45) Date of Patent: Mar. 19, 2024

(54) ANIMAL OWNERSHIP MANAGEMENT SYSTEM AND METHOD

(71) Applicant: CERES TAG PTY LTD, Samford (AU)

(72) Inventor: David Ian Smith, Samford (AU)

(73) Assignee: CERES TAG PTY LTD, Samford (AU)

( * ) Notice: Subject to any disclaimer, the term of this patent is extended or adjusted under 35 U.S.C. 154(b) by 0 days.

(21) Appl. No.: 18/277,542

(22) PCT Filed: Apr. 28, 2022

(86) PCT No.: PCT/AU2022/050393
§ 371 (c)(1),
(2) Date: Aug. 16, 2023

(87) PCT Pub. No.: WO2022/226596
PCT Pub. Date: Nov. 3, 2022

(65) Prior Publication Data
US 2024/0032504 A1   Feb. 1, 2024

(30) Foreign Application Priority Data
Apr. 30, 2021   (AU) ................ 2021901282

(51) Int. Cl.
*G06Q 50/02* (2012.01)
*A01K 11/00* (2006.01)
(Continued)

(52) U.S. Cl.
CPC ...... *A01K 11/008* (2013.01); *G06F 16/24575* (2019.01); *G06K 19/0717* (2013.01); *G06Q 50/02* (2013.01); *G06F 16/25* (2019.01)

(58) Field of Classification Search
CPC .................................................. A01K 11/008
See application file for complete search history.

(56) References Cited

U.S. PATENT DOCUMENTS

2004/0230607 A1\* 11/2004 Pawlick ................ A01K 29/00
2005/0145187 A1    7/2005 Gray
(Continued)

FOREIGN PATENT DOCUMENTS

| GB | 2451801 | 2/2009 |
| WO | 2007109838 | 10/2007 |
| WO | 2021050775 | 3/2021 |

OTHER PUBLICATIONS

International Search Report and Written Opinion dated Jun. 27, 2022 in PCT International Patent Application No. PCT/AU2022/050393.

(Continued)

*Primary Examiner* — Joseph H Feild
*Assistant Examiner* — Pameshanand Mahase
(74) *Attorney, Agent, or Firm* — SNELL & WILMER L.L.P.

(57) ABSTRACT

An animal ownership management system including an electronic tag configured to be attached to an animal, an accreditation database storing certified ownership data associated with the animal and the current owner, an animal monitoring database in communication with the electronic tag and accreditation database. The animal monitoring database is configured to receive the location of the animal, access the accreditation database and match the location of the animal with a location associated with a property of a new owner stored in the accreditation database, issue an electronic ownership transfer request to the current owner and the new owner, receive a confirmation from the current owner and the new owner, record the new owner as the current owner of the animal in the animal monitoring database, and transmit the electronic ownership transfer request to the accreditation database to record the new owner as the current owner of the animal.

20 Claims, 4 Drawing Sheets

(51) Int. Cl.
    *G06F 16/2457*     (2019.01)
    *G06F 16/25*     (2019.01)
    *G06K 19/07*     (2006.01)

(56) References Cited

U.S. PATENT DOCUMENTS

| | | | |
|---|---|---|---|
| 2006/0054092 A1* | 3/2006 | Valencia | G16H 20/60 |
| | | | 119/51.02 |
| 2006/0201432 A1* | 9/2006 | Pratt | G06Q 10/10 |
| | | | 119/51.02 |
| 2013/0275316 A1 | 10/2013 | Teng | |
| 2015/0097668 A1 | 4/2015 | Toth | |
| 2021/0409906 A1* | 12/2021 | Ickovic | A01K 11/008 |

OTHER PUBLICATIONS

Tech Tips, NLIS Database, Livestock Movements, Aug. 2014.

\* cited by examiner

ANIMAL OWNERSHIP MANAGEMENT SYSTEM AND METHOD

CROSS REFERENCE TO RELATED APPLICATIONS

This application is a U.S. national stage entry under 35 U.S.C. § 371 of International Application No. PCT/AU2022/050393 filed Apr. 28, 2022 entitled "ANIMAL OWNERSHIP MANAGEMENT SYSTEM AND METHOD", which claims priority to, and the benefit of, Australian Patent Application Serial No. 2021901282 filed on Apr. 30, 2021, entitled "ANIMAL OWNERSHIP MANAGEMENT SYSTEM AND METHOD". Each of the foregoing applications are hereby incorporated by reference in their entirety for all purposes.

TECHNICAL FIELD

The present invention relates to an animal ownership management system and method. More particularly, embodiments of the invention relate to systems and methods for animal ownership management which improve the process for animal ownership transfer.

BACKGROUND

Any references to methods, apparatus or documents of the prior art are not to be taken as constituting any evidence or admission that they formed, or form part of the common general knowledge.

Traditionally, animal ownership, and particularly livestock ownership, has been managed via manual, paper-based processes.

The manual recording process commonly results in information inaccuracies due to human error and delays in accreditation authorities having the most up to date information on animal movement.

Some attempts to move away from paper-based systems have been made but these systems still rely on manual data entry.

In recent years, increased bio-security concerns relating to the spread of diseases and contamination have led to greater focus on livestock monitoring and surveillance.

Within Australia, all primary industry animal movements (i.e. buying and selling) must be recorded for biosecurity and disease control. This is currently done by attaching a passive RFID "button" tag to the ear of the animal. When the animal leaves a PIC (property identification code), the RFID is read and the movement has to be recorded and submitted to the National Livestock Identification System (NLIS), with details of the from and to PIC.

This scheme was started in 2002 and until recently the movement was done manually, using an NVD (National Vendor Declaration) book or electronic NVD, containing several carbon copies. This can be problematic as NVDs are often rejected due to non-compliance and then must be rectified. Some common problems include failing to fill out all questions required; incorrectly listing numbers, brand, and breed details or providing information in unacceptable formats (e.g. D/M rather than "droughtmaster"); and not providing livestock history. As a result of the incorrect NVDs, the livestock may be withheld from auction or a processing shift.

In view of the above, an improved system for managing animal and livestock ownership is required.

SUMMARY OF INVENTION

In an aspect, the invention provides an animal ownership management system comprising:
an electronic tag configured to be attached to an animal, the electronic tag being exclusively associated with a current owner and the animal, the electronic tag being configured to determine a location of the animal and transmit the location of the animal;
an accreditation database storing certified ownership data associated with the animal and the current owner, the certified ownership data including a location associated with a property of the current owner;
an animal monitoring database in communication with the electronic tag and accreditation database, the animal monitoring database being configured to receive and store the location of the animal;
wherein the animal monitoring database is configured to:
receive the location of the animal from the electronic tag attached to the animal;
access the accreditation database and match the location of the animal with a location associated with a property of a new owner stored in the accreditation database;
issue an electronic ownership transfer request to the current owner and the new owner;
receive a confirmation of the electronic ownership transfer request from the current owner and the new owner;
in response to the confirmation of the electronic ownership transfer request, record the new owner as the current owner of the animal in the animal monitoring database; and
transmit the electronic ownership transfer request to the accreditation database to record the new owner as the current owner of the animal.

Preferably, the step of receiving the location of the animal includes comparing the location of the animal with the location associated with the property of the current owner.

Preferably, the electronic tag is configured to determine the location of the animal at predetermined intervals of time. Preferably, the electronic tag determines the location of the animal approximately every 4 to 6 hours.

Preferably, the electronic tag is further configured to determine physiological measurements of the animal based on sensors of the electronic tag. Preferably, the electronic tag is further configured to transmit the physiological measurements to the animal monitoring database, wherein the animal monitoring database stores the physiological measurements. In some embodiments, the animal monitoring database transmits the physiological measurements to the accreditation database.

Preferably, the electronic tag is configured to transmit the location of the animal to a satellite which is in communication with the animal monitoring database. Alternatively, or additionally, the electronic tag is configured to transmit the location of the animal to a mobile communication base station. Preferably, the mobile communication base station comprises a Low Power Wide Area Network transceiver.

Preferably, the animal monitoring database combines the location and/or the physiological measurements received from the electronic tag with owner information relating to the current owner stored on the animal monitoring database.

Preferably, the electronic tag comprises memory configured to store tag information. Preferably, the memory is configured to store location data obtained from the GPS receiver, and at least one of a timestamp associated with a time of the location data and a unique identifier associated with the electronic tag and/or the animal.

Preferably, the electronic comprises a radio frequency (RF) transceiver for wireless communication.

Preferably, the electronic ownership transfer request comprises an email, SMS and/or notification transmitted to a respective email address, application or electronic device of the current owner and the new owner.

Preferably the animal monitoring database is configured to identify a movement of the electronic tag to a location not associated with the property of the current owner.

Preferably, the confirmation of the electronic ownership transfer request from the current owner and the new owner is confirmed with a single touch or single action by the current owner and the new owner.

Preferably, recording the new owner as the current owner of the animal in the animal monitoring database includes granting access to current and historical location data associated with the animal to the current owner.

Preferably, recording the new owner as the current owner of the animal in the animal monitoring database includes granting access to current and historical physiological data associated with the animal to the current owner.

In another aspect, the invention provides a method of managing animal ownership, the method comprising the steps of:
  determining a location of an animal having an electronic tag thereattached, the electronic tag being exclusively associated with a current owner and the animal;
  receiving the location of the animal at an animal monitoring database from the electronic tag;
  accessing an accreditation database and matching the location of the animal with a location associated with a property of a new owner stored in the accreditation database;
  issuing an electronic ownership transfer request to the current owner and the new owner;
  receiving a confirmation of the electronic ownership transfer request from the current owner and the new owner;
  in response to the confirmation of the electronic ownership transfer request, recording the new owner as the current owner of the animal in the animal monitoring database; and
  transmitting the electronic ownership transfer request to the accreditation database to record the new owner as the current owner of the animal.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
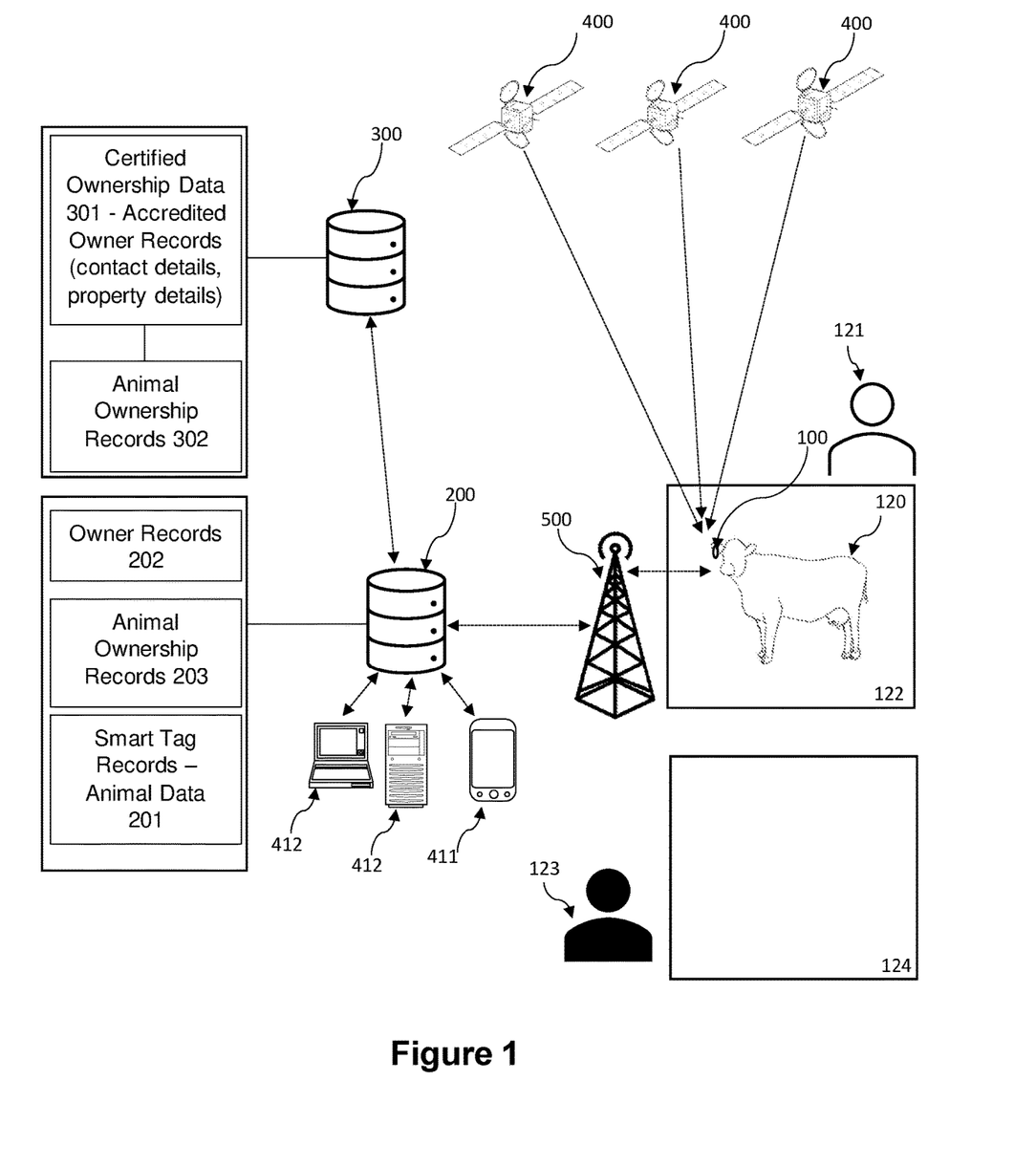
FIG. 1 illustrates an embodiment of the animal ownership management system according to the present invention.

FIG. 1 illustrates an animal ownership management system 10 according to an embodiment of the present invention. The animal ownership management 10 includes an electronic tag in the form of a smart tag 100 attached to an animal in the form of a cow 120.

In the present embodiment, cow 120 is owned by current owner 121 and the smart tag 100 is exclusively associated with the current owner 121 and cow 120 through a registration process involving the smart tag 100. In some embodiments, the smart tag 100 activates upon attachment to cow 120 and ceases functioning upon removal from cow 120 to prevent the smart tag 100 from being transferred from one animal to another unauthorised.

An "owner", as referred to herein, is to be understood to be an individual or other entity that is legally entitled to own, sell and otherwise dispose of or acquire livestock and/or animals.

Figure 3:
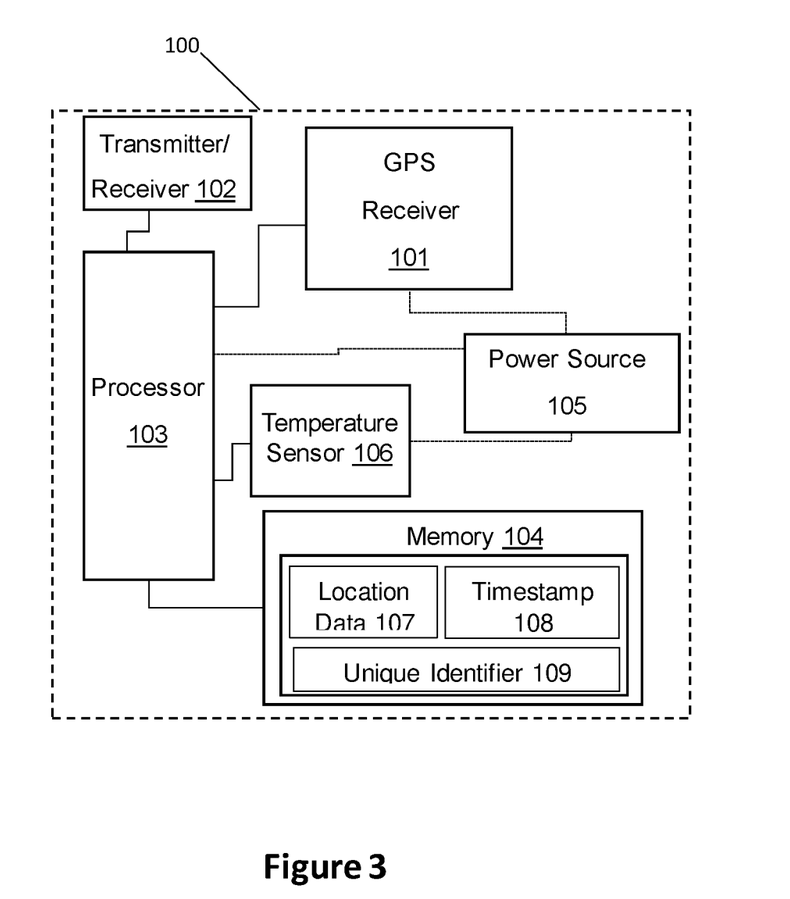
FIG. 3 illustrates the components of an embodiment of an electronic smart tag for attaching to a cow or other animal or livestock.

Referring to FIG. 3, the smart tag 100 can be seen to be configured with a GPS receiver 101 to determine a location of cow 120 and an RF transmitter/receiver 102 for communicating the location of cow 120 to remote databases and devices. This will be described in more detail below.

The smart tag 100 includes a processor 103 and memory 104 which controls the various components of the smart tag 100 and stores relevant data and instructions (such as the location data acquired by the GPS receiver 101, for example). The smart tag 100 also includes a power source 105 for powering the smart tag 100. The power source 105 is preferably a battery.

The location of cow 120 may be determined using the GPS receiver 101 at set intervals of time (e.g. every hour, every four to six hours, or once every day) or upon receipt of an instruction received from a remote source (this will described in more detail below) and the location data 107 is received by the processor 103 from the GPS receiver 101. The location data 107 may also have a timestamp 108 and be associated with the specific animal through animal identification information in the form of a unique identifier 109 (such as a unique identifier stored in an RFID in the smart tag 100, for example). This information is stored by the processor 103 in memory 104 for transmission to a remote database at a later time.

The smart tag 100 may also be configured with a range of sensors for measuring physiological attributes of cow 120. The sensor shown in the present embodiment is a temperature sensor 106 for measuring and communicating the temperature of cow 120. However, other sensors, such as heart rate monitors, for example, could be used to measure and monitor multiple physiological attributes of the cow 120.

In addition to the smart tag 100, the animal ownership management system 10 includes a first database in the form of animal monitoring database 200 and a second database in the form of accreditation database 300. Accreditation database 300 includes biosecurity information for the management, control and prevention of disease and chemical residues spreading from one location to another.

Animal monitoring database 200 is a centralized database which is in communication with the smart tag 100 to receive and store animal data 201 including the location and/or physiological measurements of the cow 120. Animal monitoring database 200 also records animal ownership records 203 (including current and historical ownership details).

The animal monitoring database 200 monitors the smart tag 100 and communicates with the accreditation database 300 to facilitate ownership transfers and ensure accurate ownership records are maintained and that local and national legislation regarding the movement and ownership of animals and livestock is adhered to.

Accreditation database 300 is a database which records certified ownership data 301 including the contact details (such as a phone number, address and/or email address, for example) and property details of accredited animal and livestock owners, in addition to present and historical ownership of animals and livestock in the form of animal ownership records 302. In the present embodiment, the accreditation database 300 records the certified ownership data 301 relating to cow 120, including a record that current owner 121 is the owner of cow 120 and also including a location associated with a property 122 of the current owner 121.

Importantly, the accreditation database 300 includes records of all accredited owners of livestock and animals (i.e. individuals or other entities licensed to own, sell and otherwise dispose of or acquire livestock and/or animals) in the form of the Certified Ownership Data 301 described above. The traceability, especially the lifetime traceability and lifetime records of movement of animals and livestock is important for biosecurity purposes.

The accreditation database 300 is, preferably, a government instituted and managed database that holds official records of accredited animal and livestock owners. Alternatively, the accreditation database 300 may be owned and managed by an accreditation body. In any event, the accreditation database 300 stores the official records of who is accredited, licensed, registered or otherwise legally eligible to own livestock and which livestock is in the possession of accredited, licensed, registered or otherwise legally eligible individual.

In use, animal monitoring database 200 transmits a command to the smart tag 100 to retrieve location and, optionally, physiological information, about the animal (cow 120). This is a check step to confirm that cow 120 remains at property 122 of current owner 121.

In some embodiments, the smart tag 100 may be programmed to send location information to the animal monitoring database 200 unprompted. For example, smart tag 100 may be programmed to transmit the location information to the animal monitoring database 200 every 12 hours, or at some other programmed time interval.

Communication between the animal monitoring database 200 and the smart tag 100 may be facilitated through a number of known means. For example, the smart tag 100 and animal monitoring database 200 may be configured to communicate via satellites, such as low earth orbiting satellites, or through a mobile communication base station 500, such as a cellular communication tower or Low Power Wide Area Network (LPWAN) base station.

In response to receiving the command, the smart tag 100 transmits a data packet including the location data determined from the GPS receiver 101 through communication with GPS satellites 400, along with animal identification information and, optionally, the timestamp relating to the time the location was determined. In some embodiments, the smart tag 100 may determine the location of cow 120 immediately (or in real time) in response to the request from animal monitoring database 200.

Figure 2:
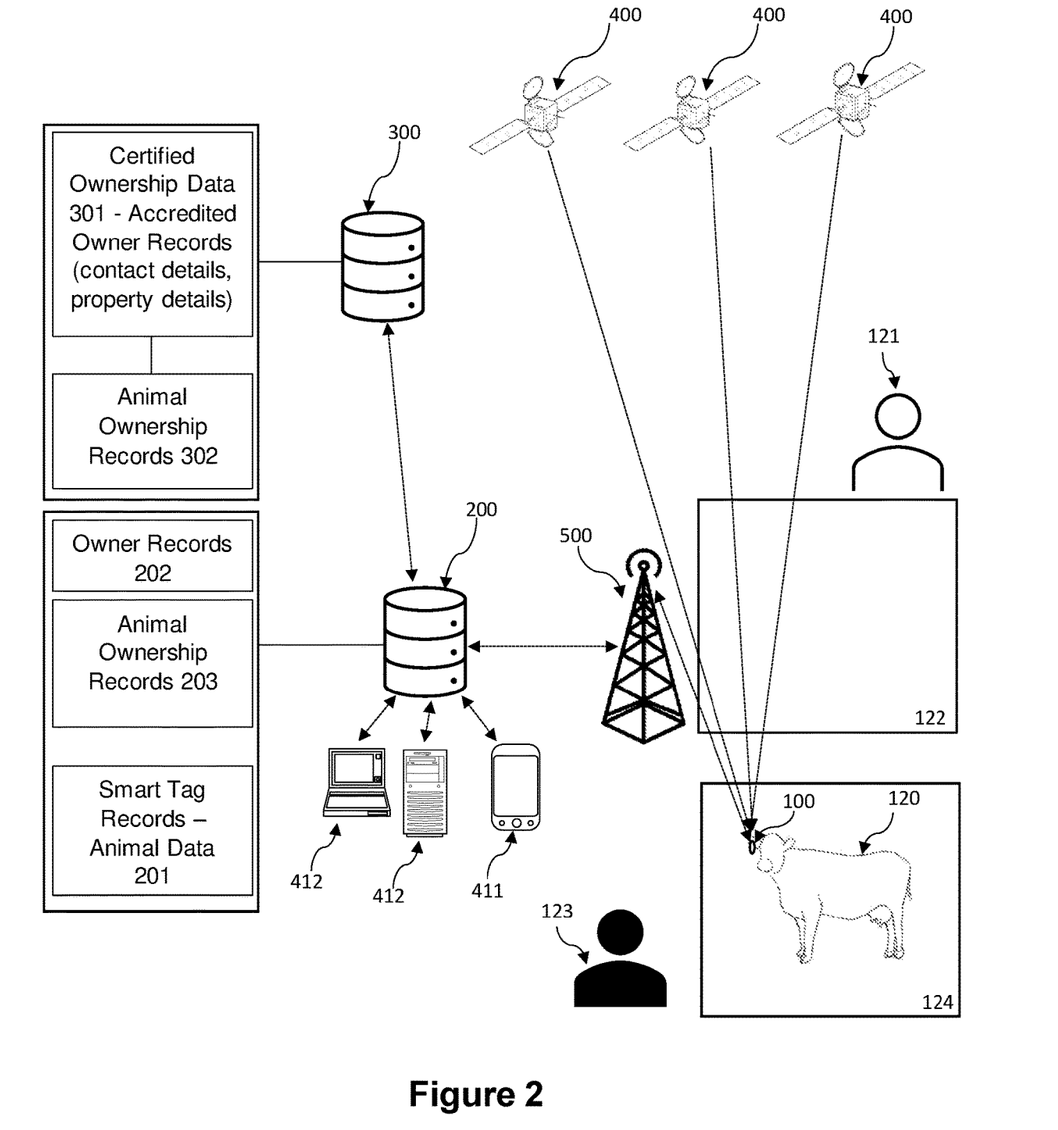
FIG. 2 illustrates the animal ownership management system detecting that the cow has moved from a first property to a second property.

In an example of use of system 10, new owner 123 wishes to purchase cow 120 from current owner 120 and will transport cow 120 to their property 124. Importantly, new owner 123 is an accredited livestock owner and their property 124 is registered and recorded in the accreditation database 300.

Once the purchase has been finalised, new owner 123 transports cow 120 to their property 124 which is at a location distinct from the property 122 of current owner 121.

Once cow 120 has been moved to property 124 associated with new owner 123, the smart tag 100 determines the location of cow 120 and transmits the location of cow 120 to the animal monitoring database 200.

Animal monitoring database 200 then queries accreditation database 300 to determine whether the location of cow 120 matches a location associated with the property 122 of the current owner 121. The determination of whether cow 120 has left property 122 associated with the current owner 121 may be performed in a number of ways. In one embodiment, the determination may be made based on a minimum distance being travelled by cow 120. For example, if property 122 is known to be 10 km$^2$ and cow 120 has moved 10 km from a location associated with the property 122 or from a previously determined location (such as the most recently detected location of cow 120, for example) then this may be a criterion for animal monitoring database 200 to query accreditation database 300 on the current location of cow 120 and whether said current location relates to a property of a third party.

In another embodiment, the determination may be made based on geofences. For example, current owner 121 may have a geofence corresponding to the boundaries of property 122, such that when cow 120 is detected as being outside the boundaries of the geofence, the animal monitoring database 200 is programmed to query the accreditation database 300 regarding the current location of cow 120 and determine whether cow 120 is now at a property of a potential new owner registered in the accreditation database 300.

As cow 120 has been moved to property 124 of new owner 123, the animal monitoring database 120 will detect that cow 120 has moved from a location associated with property 122 of current owner 121 and is now at a location associated with property 124 of new owner 123, whose details are also registered in the accreditation database 300 and are retrieved by the animal monitoring database 200 during the query of the location of cow 120. Consequently, animal monitoring database 200 matches the location of cow 120 with the location associated with the property 124 of the new owner 123.

In response to detecting that cow 120 is now at the property 124 of the new owner 123, the animal monitoring database 200 retrieves the contact details of the current owner 121 and new owner 123 from accreditation database 300 and issues an electronic ownership transfer request to the current owner 121 and the new owner 123. The electronic ownership transfer request may be issued in the form of an email, SMS and/or notification through an application installed on a PC 412 or smart device (such as a smartphone 411 or tablet, for example). In a preferable embodiment, shown in FIG. 4, the electronic ownership transfer request takes the form of a confirmation notification 410 sent to smartphone 411 that can be completed by each of the current owner 121 and new owner 123 selecting a single "confirm" or similar button displayed in the request, such that the ownership transfer from the current owner and the new owner can be completed by a single action or single touch from each of the current owner and the new owner.

Figure 4:
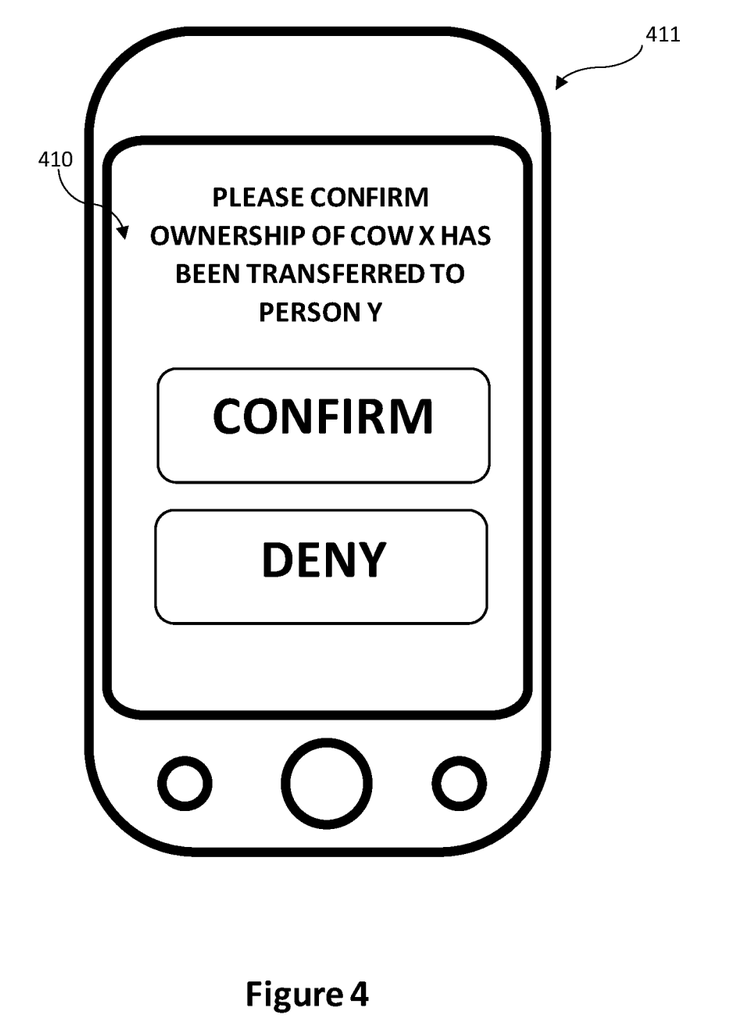
FIG. 4 illustrates an embodiment of the electronic ownership transfer request in the form of a notification on a smartphone.

If the current owner and new owner both confirm the transfer of ownership of cow 120 from current owner to new owner, the animal monitoring database 200 updates the Owner Records 202 to record new owner as the current owner of cow 120 and transmits the ownership transfer request to the accreditation database 300 to record the new owner as the current owner of the animal in the corresponding Certified Ownership Data 301, thereby completing the ownership transfer process without the need for signing numerous documents. Once the ownership transfer has been completed, the now current owner has access to the Animal Data 201 associated with cow 120, including current location and physiological data, and historical location and physiological data of cow 120. Thus, the now current owner is granted access to current and historical location data (and, in some embodiments, current and historical physiological data) associated with cow 120.

In summary, a preferred embodiment of the invention provides an animal ownership management system for easily transferring the ownership of livestock and animals from one party to another. In some preferred embodiments, this is performed via a single touch confirmation provided by each party involved in the ownership transfer. In order to facilitate this ownership transfer, the preferred embodiment determines a location of an animal (cow 120, for example) having an electronic tag (smart tag 100) thereattached. The electronic tag is exclusively associated with a current owner and the animal.

An animal monitoring database 200 receives the location of the animal from the electronic tag 100, accesses an accreditation database 300 and matches the location of the animal with a location associated with a property of a new owner stored in the accreditation database 300.

The animal monitoring database 200 then issues an electronic ownership transfer request to the current owner and the new owner.

Each of the current owner and the new owner confirm the ownership transfer via the electronic ownership transfer request.

As a result, the animal monitoring database 200 receives the confirmation of the electronic ownership transfer request from the current owner and the new owner.

In response to the confirmation of the electronic ownership transfer request, the animal monitoring database records the new owner as the current owner of the animal and transmits the electronic ownership transfer request to the accreditation database to record the new owner as the current owner of the animal.

Embodiments of the invention described herein allow for a streamlined transfer of ownership of animals and livestock from one accredited party to another accredited party without the need for cumbersome paperwork, that is often incorrectly completed, either delaying or disrupting the ownership transfer process.

Embodiments of the invention also allow for an immutable electronic lifetime record of the livestock to be kept and accessed at any time to query where the livestock may have been in the event of a biosecurity risk.

An advantage provided by embodiments of the invention resides in the ability to automatically transfer historical data to a new owner upon transfer of animal ownership.

A further advantage provided by embodiments of the invention resides in the ability of the system to automatically detect the location of an animal and cross reference that location against a location stored in an accreditation database to determine whether the animal still resides at the location that it is registered to or that the animal has been moved. In effect, embodiments of the system provide single touch transfer of ownership of an animal with complete and comprehensive traceability of past, present and future movement. Thus, the system is automating the process of animal movement notification with minimal human intervention or administration.

The term "property" as used herein is to be understood to refer to land, or other form of real estate, owned by an individual (such as the current owner or new owner within the context of this specification).

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. An animal ownership management system comprising:
   an electronic tag configured to be attached to an animal, the electronic tag being exclusively associated with a current owner and the animal, the electronic tag being configured to determine a location of the animal and transmit the location of the animal;
   an accreditation database storing certified ownership data associated with the animal and the current owner, the certified ownership data including a location associated with a property of the current owner;
   an animal monitoring database in communication with the electronic tag and accreditation database, the animal monitoring database being configured to receive and store the location of the animal;
   wherein the animal monitoring database is configured to:
      receive the location of the animal from the electronic tag attached to the animal;
      access the accreditation database and match the location of the animal with a location associated with a property of a new owner stored in the accreditation database;
      issue an electronic ownership transfer request to the current owner and the new owner;
      receive a confirmation of the electronic ownership transfer request from the current owner and the new owner;
      in response to the confirmation of the electronic ownership transfer request, record the new owner as the current owner of the animal in the animal monitoring database; and
      transmit the electronic ownership transfer request to the accreditation database to record the new owner as the current owner of the animal.

2. The animal ownership management system of claim 1, wherein the receiving the location of the animal includes comparing the location of the animal with the location associated with the property of the current owner.

3. The animal ownership management system of claim 1, wherein the electronic tag is configured to determine the location of the animal at predetermined intervals of time.

4. The animal ownership management system of claim 3, wherein the electronic tag determines the location of the animal approximately every 4 to 6 hours.

5. The animal ownership management system of claim 1, wherein the electronic tag is configured to determine physiological measurements of the animal based on sensors of the electronic tag.

6. The animal ownership management system of claim 5, wherein the electronic tag is configured to transmit the physiological measurements to the animal monitoring database and wherein the animal monitoring database stores the physiological measurements.

7. The animal ownership management system of claim 6, wherein the animal monitoring database transmits the physiological measurements to the accreditation database.

8. The animal ownership management system of claim 5, wherein the animal monitoring database combines at least one of the location or the physiological measurements received from the electronic tag with owner information relating to the current owner stored on the animal monitoring database.

9. The animal ownership management system of claim 1, wherein the electronic tag is configured to transmit the location of the animal to a satellite which is in communication with the animal monitoring database.

10. The animal ownership management system of claim 1, wherein the electronic tag is configured to transmit the location of the animal to a mobile communication base station.

11. The animal ownership management system of claim 10, wherein the mobile communication base station comprises a Low Power Wide Area Network transceiver.

12. The animal ownership management system of claim 1, wherein the electronic tag comprises memory configured to store tag information.

13. The animal ownership management system of claim 1, wherein the memory is configured to store location data obtained from the GPS receiver, and at least one of a timestamp associated with a time of the location data or a unique identifier associated with at least one of the electronic tag or the animal.

14. The animal ownership management system of claim 1, wherein the electronic comprises a radio frequency (RF) transceiver for wireless communication.

15. The animal ownership management system of claim 1, wherein the electronic ownership transfer request comprises at least one of an email, SMS or notification transmitted to a respective email address, application or electronic device of the current owner and the new owner.

16. The animal ownership management system of claim 1, wherein the animal monitoring database is configured to identify a movement of the electronic tag to a location not associated with the property of the current owner.

17. The animal ownership management system of claim 1, wherein the confirmation of the electronic ownership transfer request from the current owner and the new owner is confirmed with a single touch or single action by each of the current owner and the new owner.

18. The animal ownership management system of claim 1, wherein recording the new owner as the current owner of the animal in the animal monitoring database includes granting access to current and historical location data associated with the animal to the current owner.

19. The animal ownership management system of claim 18, wherein recording the new owner as the current owner of the animal in the animal monitoring database includes granting access to current and historical physiological data associated with the animal to the current owner.

20. A method of managing animal ownership, the method comprising the steps of:
- determining a location of an animal having an electronic tag there attached, the electronic tag being exclusively associated with a current owner and the animal;
- receiving the location of the animal at an animal monitoring database from the electronic tag;
- accessing an accreditation database and matching the location of the animal with a location associated with a property of a new owner stored in the accreditation database;
- issuing an electronic ownership transfer request to the current owner and the new owner;
- receiving a confirmation of the electronic ownership transfer request from the current owner and the new owner;
- in response to the confirmation of the electronic ownership transfer request, recording the new owner as the current owner of the animal in the animal monitoring database; and
- transmitting the electronic ownership transfer request to the accreditation database to record the new owner as the current owner of the animal.

* * * * *